United States Patent [19]

Benedetti et al.

[11] Patent Number: 5,507,610
[45] Date of Patent: Apr. 16, 1996

[54] REFUSABLE FASTENER INCLUDING A PIN AND GROMMET

[75] Inventors: Nicholas M. Benedetti, Macomb County; Zdravko Kovac, Macomb, both of Mich.

[73] Assignee: Emhart Inc., Newark, Del.

[21] Appl. No.: 280,954

[22] Filed: Jul. 27, 1994

[51] Int. Cl.⁶ ............................. F16B 19/00; F16B 21/00
[52] U.S. Cl. ..................... 411/339; 411/509; 411/908; 24/297
[58] Field of Search ..................... 411/338, 339, 411/508, 509, 510, 512, 908, 913; 24/297, 453

[56] References Cited

U.S. PATENT DOCUMENTS

| | | | |
|---|---|---|---|
| 3,988,808 | 11/1976 | Poe et al. | 24/297 X |
| 4,176,428 | 12/1979 | Kimura | 24/297 X |
| 4,716,633 | 1/1988 | Rizo | 24/297 X |
| 4,750,878 | 6/1988 | Nix et al. | 411/512 X |
| 4,861,208 | 8/1989 | Boundy | 411/339 |
| 4,874,276 | 10/1989 | Iguchi | 24/297 X |
| 5,339,491 | 8/1994 | Sims | 411/339 X |

*Primary Examiner*—Neill R. Wilson
*Attorney, Agent, or Firm*—E. D. Murphy

[57] ABSTRACT

A fastener for releasably securing first and second panels together includes a pin for being secured in an opening of a first panel, and a grommet for being secured in an opening of the second panel and for releasably receiving a shank of the pin to thereby releasably secure the first and second panels together. The pin includes a shank having a plurality of spaced apart circumferential grooves thereon, and a pair of spaced apart flanges connected to an end of the shank for securing the pin in the opening of the first panel. The grommet includes a tubular body defining a passageway for receiving the shank and has at least one longitudinal slot opening outwardly to an end thereof to define a radially pliant portion of the tubular body. A flange may be connected to the tubular body adjacent an end thereof opposite the longitudinal slot and cooperates with a plurality of tabs connected to the tubular body to secure the grommet within the opening of the second panel. At least one inwardly extending projection is provided on an interior surface of the radially pliant portion of the tubular body for engaging one of the grooves of the shank for releasably securing the pin and grommet together.

31 Claims, 3 Drawing Sheets

REFUSABLE FASTENER INCLUDING A PIN AND GROMMET

FIELD OF THE INVENTION

The invention relates to the field of fasteners, and more particularly, to a reusable fastener, such as for automotive or appliance applications.

BACKGROUND OF THE INVENTION

Reusable plastic fasteners are commonly used to attach together two panels, yet permit the panels to be detached or disconnected later if desired. For example, in the automotive industry such plastic fasteners are commonly used to attach door trim panels to the supporting sheet metal of the door. Similarly, appliances, such as dishwashers or refrigerators, commonly use such fasteners to also attach trim panels.

The fastener is typically a two piece fastener so that if the panels need to be separated after original installation, such as to service the components in the door, they may be pulled apart so that one portion remains attached to the sheet metal while the other remains attached to the trim panel. The two portions may also desirably be reconnected after separation.

U.S. Pat. No. 4,375,342 to Wollar et al. discloses a reusable plastic fastener including an elongate body portion or pin which mates with a surrounding grommet. The pin includes an enlarged head at one end which rests against the panel or workpiece. The pin is inserted through an opening in the workpiece and into the grommet so that the head remains visible. The grommet includes an enlarged portion defining a flange and a pair of separable legs extending axially outwardly therefrom. The legs are forced apart by insertion of the pin to secure the grommet to the second panel. In addition, the grommet includes lugs on an interior surface thereof. The plunger includes front and rear spaced apart grooves which together with the lugs on the grommet define two detents for the fastener. The two panels are secured together between the enlarged head of the pin and the flange of the grommet.

U.S. Pat. No. 4,393,551 to Wollar et al. discloses a fastener having a head and an integrally formed shank, wherein the head includes a radial slot to permit installation into a first panel by twisting of the fastener. The shank includes a flange and a plurality of barbed-shaped projections to secure the shank within an opening of a second panel.

Another fastener is disclosed in U.S. Pat. No. 4,233,878 to McGauran et al. and includes a shank having a series of circumferential grooves therealong for engaging a grommet which, in turn, includes a nylon sleeve. U.S. Pat. No. 4,122,583 to Grittner et al. discloses another fastener such as for automotive applications that is integrally molded as one piece and includes a rectangular shank and rectangular grommet including outwardly swinging arms to secure to panels together.

U.S. Pat. No. 4,648,766 also to Wollar discloses yet another plastic fastener, such as for removably securing a decorative or trim panel. The fastener includes a shank and an outermost flange with a radial slot as described with reference to U.S. Pat. No. 4,393,551 to permit the head or flange to be rotated into an opening of a first panel. A grommet is integrally molded to the opposite end of the shank so that a frangible web initially connects the grommet to the end of the shank. The grommet includes a flange and a plurality of outwardly extending tabs adjacent the flange to secure the grommet to a second panel. The tabs are secured to the grommet body at two longitudinal positions, and, hence require considerable force to initially seat the grommet in a panel. The grommet is held onto the shank in operation by friction generated by a plurality of circumferential grooves on the shank and a relatively long and smooth bore of the grommet. Unfortunately the force for seating the grommet in the opening in the second panel is relatively high, and the pull-out force needed to later separate the panels is difficult to control. Accordingly, improper seating of the grommet is possible, and damage to one or both of the panels may result from an attempted separation.

SUMMARY OF THE INVENTION

In view of the foregoing background, it is therefore an object of the present invention to provide a reusable fastener wherein the grommet is readily fully seated in a panel during installation of the fastener.

It is yet another object of the present invention that the pull-out or separation force needed to separate the fastener, after its initial installation, be readily controlled so to prevent damage to the attached panels, yet provide a secure attachment otherwise.

These and other objects, features and advantages according to the invention are provided by a fastener including a pin for being secured in an opening of a first panel, and a grommet for being secured in an opening of the second panel and for releasably receiving a shank of the pin to thereby releasably secure the first and second panels together. The pin preferably comprises a shank having a plurality of spaced apart transverse or circumferentially extending grooves thereon, and head means connected to an end of the shank for securing the pin in the opening of the first panel. The head means may be provided by a pair of spaced apart flanges connected to the shank.

The grommet preferably includes a tubular body defining a passageway for receiving the shank therein. The tubular body, in turn, preferably has at least one longitudinal slot opening outwardly to an end thereof and defining a radially pliant portion of the tubular body. In addition, a flange may be connected to the tubular body adjacent an end thereof opposite the longitudinal slot, and tab means provided on the tubular body to cooperate with the flange for securing the grommet within the opening of the second panel.

At least one inwardly extending projection is preferably provided on an interior surface of the radially pliant portion of the tubular body for engaging one of the grooves of the shank for releasably securing the pin and grommet together. The dimensions and number of longitudinal slots, such as a pair of opposing slots, are readily configured to provide a desired seating force for the pin into the grommet.

The tab means defines a grommet seating force for inserting the grommet into the opening of the second panel. The grooves on the shank, the at least one inwardly extending projection, and the at least one longitudinal slot on the tubular body define a predetermined pin seating force for advancing the pin into the grommet. This pin seating force is desirably greater than the grommet seating force so that the grommet seats in the opening of the second panel before the pin advances into the grommet during initial installation of the fastener. Thus, proper and full seating of the grommet is assured.

The pin and the grommet are relatively movable between a preassembled position, wherein the tubular body is positioned on the shank adjacent an end thereof, and an assembled position, wherein the tubular body is positioned on a medial portion of the shank. At least one finger-like projection is preferably connected to a medial portion of the shank adjacent the flange of the grommet and extending radially outwardly when in the preassembled position. The finger-like projection provides an initial resistance and then gives way as the pin and grommet are moved from the preassembled position to the assembled position to thereby increase the pin seating force during initial installation of the fastener.

The tab means of the grommet may be a pair of oppositely positioned tabs rotationally offset from a pair of longitudinal slots on the other end of the tubular body. Each tab preferably has one end connected to the tubular body at a medial portion thereof and a second free end divergent from the tubular body and adjacent the flange so as to be outwardly biased and provide a relatively low grommet seating force, yet provide a relatively high pull-out force for the grommet.

The radially pliant portion of the tubular body defined by the longitudinal slots of the grommet preferably has a tapered forward end portion. In addition, an end of the shank opposite the head means is preferably tapered and forms a continuous tapered surface with the tapered forward end portion of the tubular body when the pin and grommet are in the preassembled position. Accordingly, alignment and installation of the fastener when in the preassembled position are facilitated.

The pin and fastener are preferably each molded plastic. Accordingly, the shank and head means of the pin are preferably integrally formed of plastic. In addition, the flange, tab means and the at least one inwardly extending projection of the grommet are also preferably integrally formed of plastic.

DETAILED DESCRIPTION OF THE PREFERRED EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
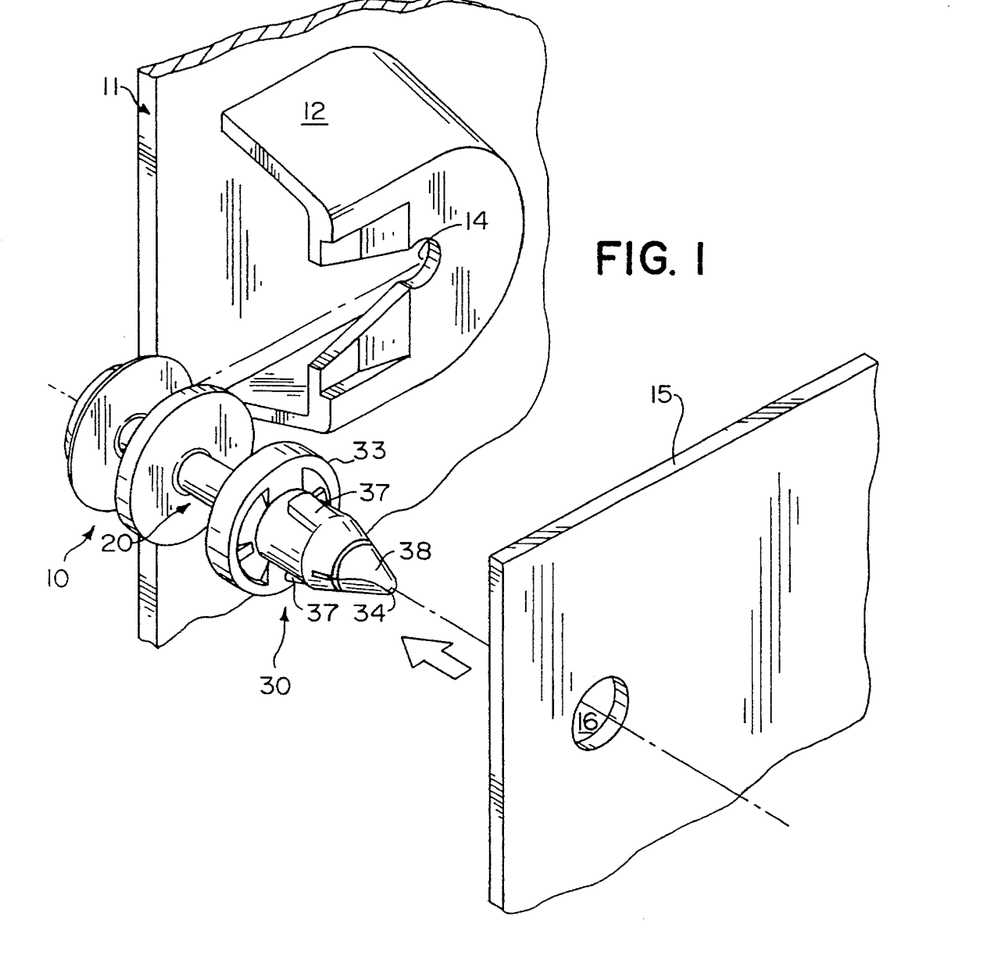
FIG. 1 is a perspective view of the fastener according to the invention in the preassembled position and prior to its initial installation into respective openings in first and second panels.

The fastener 10 according to the invention includes a pin 20 and a 30 grommet for releasably securing two panels 11, 15 together. More particularly, the panels 11, 15 include respective openings 14, 16 to receive the pin and grommet of the fastener. As shown in FIG. 1, the first panel may include a bracket or doghouse 12 extending inwardly so that the fastener 10 is not exposed. For example, the panels 11, 15 may be a door trim panel and the supporting door sheet metal, respectively, as would be readily understood by those skilled in the art. The panels 11, 15 may also be panels for an appliance such as a dishwasher. Those of skill in the art will readily appreciate other uses for the releasable and reusable fastener 10 according to the present invention.

Referring now more particularly to FIG. 1, the fastener 10 in its preassembled position is preferably first snapped into position into the slotted opening 14 of the bracket 12 of the first panel 11. The tapered end of the pin 20 is aligned with the opening 16 of the second panel 15. Thus aligned, a blow as readily delivered by the heel of the hand or a suitable tool seats the grommet 30 into the opening 16 and also advances the pin 20 into the grommet 30 to thereby secure the first and second panels together. By together is meant in fixed relationship to one another, it being understood and as illustrated herein that the panels 11, 15 may be in spaced apart relation when secured together.

Figure 2:
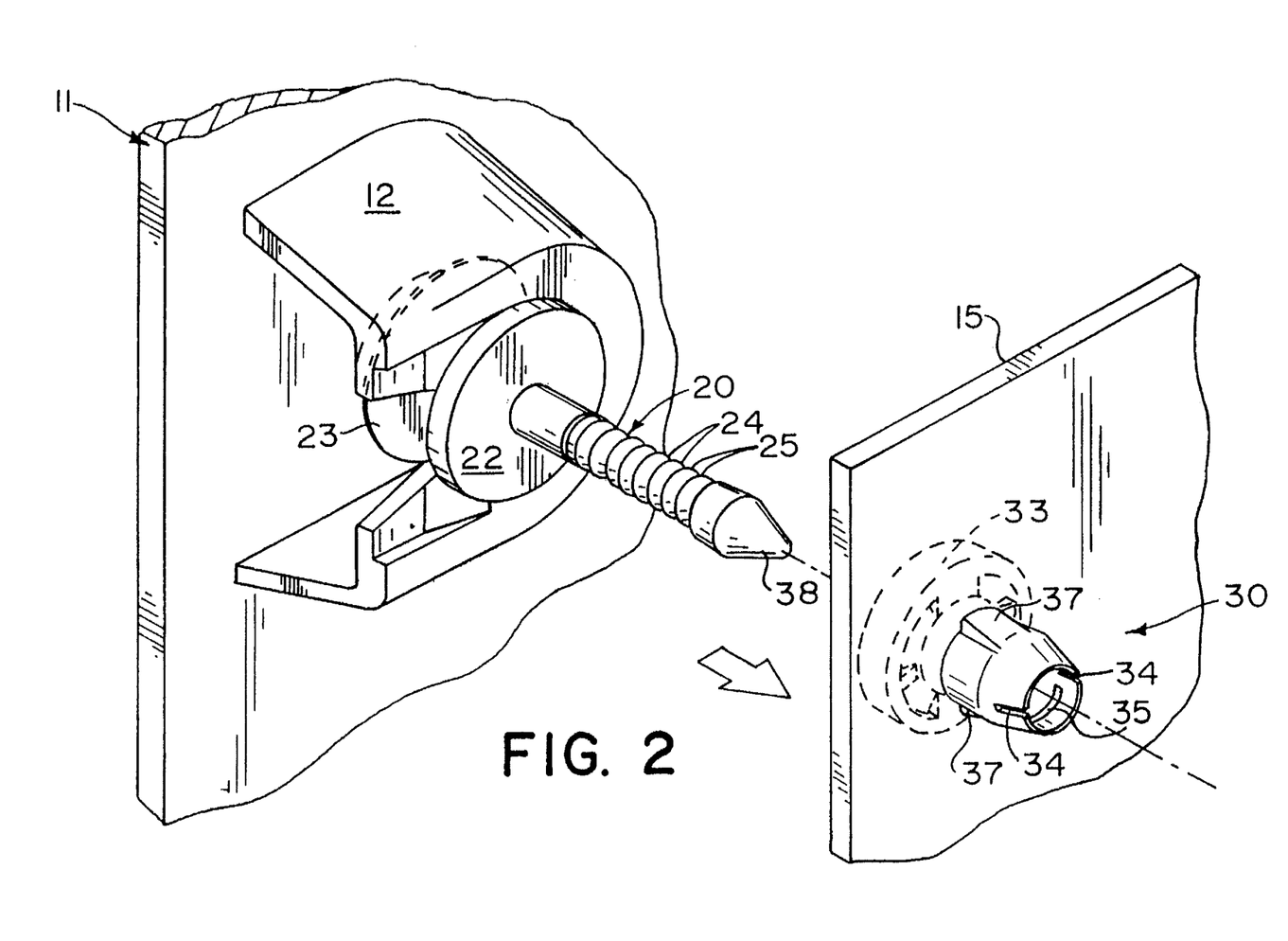
FIG. 2 is a perspective view of the fastener according to the invention after its initial installation and showing the fastener in a detached position.
Figure 3:
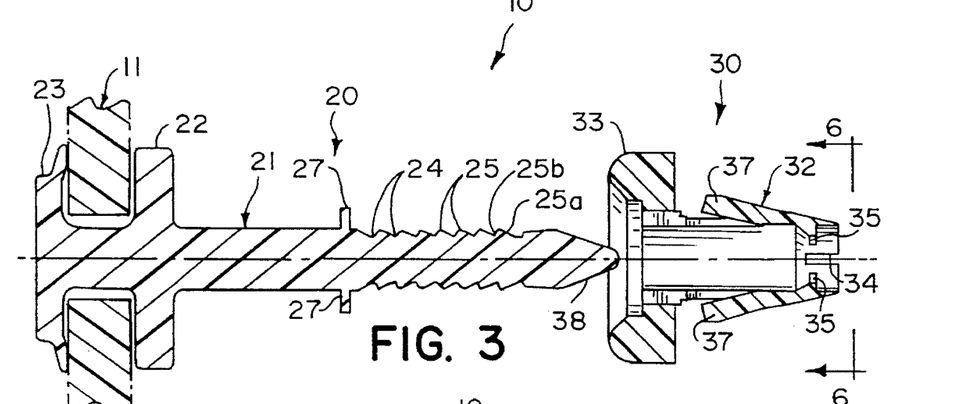
FIG. 3 is a side cross-sectional view of the fastener according to the invention illustrating the pin and grommet separated from one another.

FIG. 2 illustrates detachment of the pin 20 from the grommet 30 as when the panels are separated, such as to service components contained within an automobile door, for example. The pin 20 remains attached to the first panel 11, while the grommet 30 remains seated in the opening 16 of the second panel 15. Thus, reattaching the panels 11, 15 is straightforward and requires only alignment of the pin 20 and grommet 30 and another hand blow, for example.

Referring now additionally to FIGS. 3–6, the pin 20 and grommet 30 of the fastener 10 are further explained. The pin 20 includes a shank 21 and head means connected thereto at an end thereof for being secured within the opening 14 of the first panel 11. In the illustrated embodiment, the head means includes a pair of spaced apart generally circular flanges 22, 23. As would be readily understood by those skilled in the art a variety of other head configurations are also contemplated by the invention, such as a single flange of any desired shape, or multiple flanges having different shapes are also contemplated by the invention. For example, for securing automobile body side molding, the head means may include a generally rectangularly shaped outermost flange to provide an interlocking arrangement upon rotation into a rectangularly shaped slotted opening in a mounting bracket for the molding. Additionally, a radially slotted head may be used as disclosed in U.S. Pat. Nos. 4,393,551 and 4,648,766, the entire disclosures of which are incorporated herein by reference.

The shank 21 of the pin 20 includes a plurality or series of circumferentially extending spaced apart grooves 24 along a portion thereof. Considered slightly differently, the grooves 24 define a pattern of ridges or projections 25. The fastener 10 may be subject to vibration which may tend to cause rotation of the shank 21 of the pin 20 relative to the grommet 30; however, the circumferentially extending grooves 24 defining the ridges 25 render such rotation of no consequence to the illustrated embodiment of the fastener 10. As shown, the ridges 25 have a swept profile wherein the leading edge of the ridge 25a has an angle of about 35°–45° from parallel to the axis of the shank 21 and the trailing edge 25b has an angle of about 75°–85°. The force required to install the shank 21 of the pin 20 into the grommet 30, that is, the push-in or pin seating force, is determined by the angle of the leading edge 25a and is lower than the pull-out force. The pull-out force is determined by the angle of the trailing edge 25b. As would be readily understood by those skilled in the art, the angles may be varied to provide desired push-in and pull-out forces.

The grommet 30 includes a generally tubular body 32 and a flange 33 connected to an end thereof. The illustrated tubular body 32 includes a pair of longitudinal slots 34 opening outwardly to an end of the tubular body opposite the flange 33. The longitudinal slots 34 define a radially pliant portion of the tubular body 32. By radially pliant is further meant that the end of the tubular body 32 may controllably flex outwardly as the pin 20 is positioned into the grommet 30. Although two oppositely positioned longitudinal slots 34 are illustrated, in other embodiments of the invention one or more slots may be used. In addition, the slots 34 may extend further along the tubular body 32 beyond the tapered forward end portion, as described in greater detail below.

In the illustrated embodiment, two inwardly extending transverse ridges or projections 35 are positioned on a medial portion of the radially pliant portion of the tubular body 32. The inwardly extending projections 35 engage and cooperate with the grooves 24 and ridges 25 along the shank 21 to secure the pin 20 and grommet 30 in an assembled position to thereby secure the two panels 11, 15 together. The longitudinal slots 34 define a radially pliant portion of the tubular body so that the forces required to move the shank 21 of the pin 20 into the passageway defined by the tubular body 32 of the grommet 30 may be readily and accurately controlled, as will be appreciated by those skilled in the art.

Figure 4:
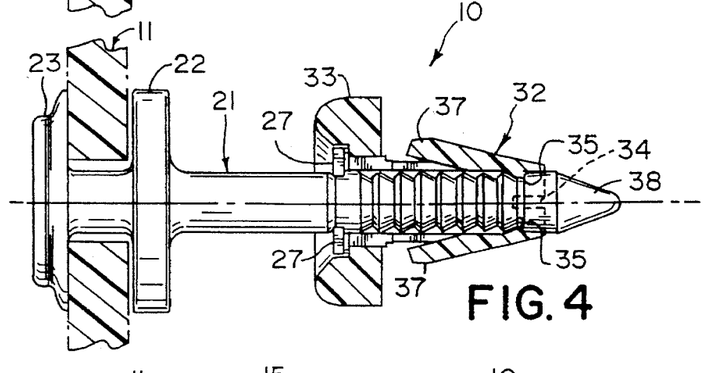
FIG. 4 is a side view, partially in section, of the fastener according to the invention and illustrating the pin and grommet in the preassembled position.
Figures 5, 6:
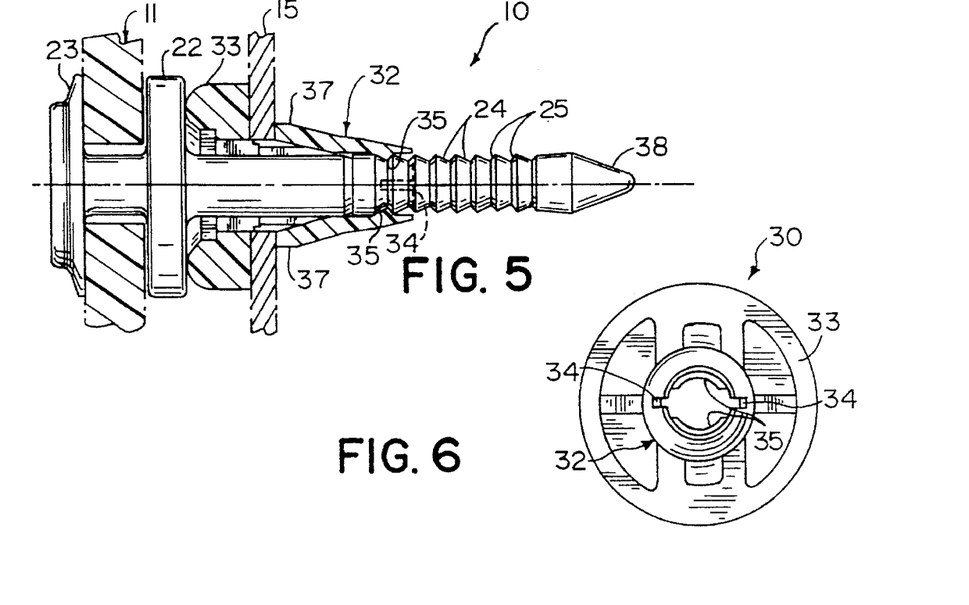
FIG. 5 is a side view, partially in section, of the fastener according to the invention and illustrating the pin and grommet in the assembled position attaching the first and second panels together.
FIG. 6 is an end view of the grommet of the fastener according to the invention with the pin removed.

Referring now more particularly to FIGS. 4 and 5, operation of the fastener 10 according to the invention is further described. FIG. 4 shows the fastener 10 in the preassembled position wherein the grommet 30 is positioned adjacent an end of the shank 21 of the pin 20. The preassembled position is also the preferred shipping and handling configuration for the fastener 10 so that two individual pieces need not be handled and installed, as would be readily appreciated by those skilled in the art. In other words, the grommet 30 and pin 20 are prealigned and connected to simplify alignment of the panels 11, 15 and installation of the fastener 10.

FIG. 5 illustrates the fastener 10 in the assembled position wherein the tubular body 32 of the grommet 30 has been advanced along the shank 21 of the pin 20 to a medial portion of the shank. As shown, the flange 33 of the grommet 30 is abutting the inner flange 22 of the pin 20. However, in view of the plurality of grooves 24 and ridges 25 on the shank 21 the two panels 11, 15 may be secured together even if the flanges 22, 33, respectively, are not in abutting relation. Typically, a space, not shown, may be provided between flanges 22,33 so that this portion of the fastener 10 accounts for any tolerances or gaps as would be readily understood by those skilled in the art. In other words, the plurality of grooves 24 and ridges 25 provide play in the longitudinal or axial direction for the fastener 10 and may permit wider tolerances in the panels 11, 15 or other components.

As also shown in FIG. 5, the second panel 15 is secured between the flange 33 of the grommet 30 and a pair of opposing tabs 37. The pair of opposing tabs 37 are preferably rotationally offset 90° from the pair of longitudinal slots 34 when only two slots are provided as illustrated. Other combinations of tabs 37 and slots 34 may be provided in other embodiments so long as grommet 30 retains its structural integrity, while allowing sufficient flexing of the tabs 37 and the radially pliant portion of the tubular body 32.

The tabs 37 are generally rectangular in shape in the illustrated embodiment, with one end of each tab connected to the tubular body 32 and the other, or free end, diverging from the imaginary cylinder defined by the tubular body so that the free end terminates adjacent and slightly spaced apart from the flange 33. The tabs 37 are biased outwardly from the tubular body 32 and provide tab means for securing the grommet 30 in the opening 16 of the second panel 15. The tabs 37 flex inward as the grommet 30 is inserted into the opening in the second panel. Moreover, because the tabs 37 have free ends adjacent the flange 33 they define a predetermined grommet seating force that is relatively low, while providing a relatively high pull-out force for unseating the grommet 30 once installed. The grommet 30 is typically not removed from the opening 16 once installed even if the fastener 10 is detached and the panels separated as shown in FIG. 2.

It is another advantageous feature that the grommet 30 seats within the opening in the second panel 15 before the pin 20 moves further into the grommet. Thus, proper seating of the grommet is ensured during installation, even though the grommet 30 is typically positioned so that its flange 33 does not abut the inner flange 22 of the pin 20. The plurality of spaced apart grooves 24 and ridges 25 on the shank 21, the configuration of the longitudinal slots 34, and the inwardly extending projections 35 on the radially pliant portion of tubular body 32 define a predetermined pin seating force for advancing the pin 20 into the grommet. The profile of the ridges 25 and grooves 24 also define the pin seating force. The pin seating force is greater than the grommet seating force so that the grommet 30 seats in the opening of the second panel 15 before the pin 20 advances further into the grommet during initial installation of the fastener 10. The length and width of the longitudinal slots 34, as well as their number, of the tubular body 32 may be readily configured to provide the desired pin seating and pull-out forces.

To further increase the pin seating force for initial installation, a pair of optional finger-like projections 27 may be connected to a medial portion of the shank 21 adjacent the flange 33 of the tubular body 32 and extending radially outwardly when the grommet and pin are in the preassembled position (FIGS. 1 and 4). The projections 27 may give way by breaking away or pivoting toward the shank 21 as the pin 20 and grommet 30 are moved from the preassembled position (FIG. 4) to the assembled position (FIG. 5) to thereby increase the pin seating force during initial installation of the fastener 10.

As shown in the illustrated embodiment, the end 38 of the shank 21 opposite the head means is preferably tapered. In addition, the grommet 30 may also have a tapered forward end. More particularly, the radially pliant portion of the tubular body 32 as defined by the longitudinal slots 34 may have a progressively decreasing outer diameter extending to the end thereof to thus define a tapered end portion for the tubular body 32. Together the tapered grommet end and the tapered shank end 38 form a continuous tapered surface when the pin 20 and grommet 30 are in the preassembled position (FIGS. 1 and 4). This tapered surface shape facilitates alignment and positioning of the fastener 10 within the opening 16 of the second panel 15.

The fastener 10 according to the invention is preferably formed from molded plastic, such as nylon, as would be readily understood by those skilled in the art. Moreover, the pin 20 including the shank 21 and a suitable head, along with the optional finger-like projections 27, and the series of grooves 24 on the shank are preferably integrally molded. Similarly, the grommet 30 including the opposing tabs 37, flange 33, slots 34 and inwardly extending projections 35 are preferably integrally molded of the plastic material.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fastener for releasably securing first and second panels together at respective openings therein, said fastener comprising:

a pin comprising a shank having a plurality of spaced apart transverse grooves thereon, and head means connected to an end of said shank for securing said pin in the opening of the first panel; and a grommet for being secured in the opening of the second panel and for releasably receiving said shank of said pin to thereby releasably secure the first and second panels together, said grommet comprising a tubular body defining a passageway for receiving said shank therein, said tubular body having at least one longitudinal slot opening outwardly to an end thereof and defining a radially pliant portion of said tubular body, a flange connected to said tubular body adjacent an end thereof opposite said at least one longitudinal slot, tab means connected to said tubular body and comprising at least one outwardly biased tab cooperating with said flange for securing said grommet within the opening of the second panel, and at least one inwardly extending projection connected to an interior surface of said radially pliant portion of said tubular body for engaging one of said grooves of said shank for releasably securing said shank and said tubular body;

wherein said tab means defines a grommet seating force for inserting said grommet into the opening of the second panel; wherein said plurality of spaced apart grooves on said shank, said at least one longitudinal slot in said tubular body, and said at least one inwardly extending projection connected to said radially pliant portion of said tubular body define a pin seating force for advancing said pin into said grommet that is greater than said grommet seating force so that said grommet seats in the opening of the second panel before said pin advances into said grommet during initial installation of the fastener.

2. A fastener according to claim 1 wherein said pin and said grommet are relatively movable between a preassembled position, wherein said tubular body is positioned on said shank adjacent an end thereof, and an assembled position wherein said tubular body is position on a medial portion of said shank; and further comprising at least one projection connected to a medial portion of said shank adjacent said flange and extending radially outwardly when in the preassembled position for providing an initial resistance and then giving way as said pin and grommet are moved from the preassembled position to the assembled position to thereby increase the pin seating force during initial installation of the fastener.

3. A fastener for releasably securing first and second panels together at respective openings therein, said fastener comprising:

a pin comprising a shank having a plurality of spaced apart transverse grooves thereon, and head means connected to an end of said shank for securing said pin in the opening of the first panel; and a grommet for being secured in the opening of the second panel and for releasably receiving said shank of said pin to thereby releasably secure the first and second panels together, said grommet comprising a tubular body defining a passageway for receiving said shank therein, said tubular body having at least one longitudinal slot opening outwardly to an end thereof and defining a radially pliant portion of said tubular body, a flange connected to said tubular body adjacent an ends thereof opposite said at least one longitudinal slot, tab means connected to said tubular body and comprising at least one outwardly biased tab cooperating with said flange for securing said grommet within the opening of the second panels, and at least one inwardly extending projection connected to in interior surface of said radially pliant portion of said tubular body for engaging one of said grooves of said shank for releasably securing said shank and said tubular body;

wherein said at least one tab has one end connected to said tubular body at a medial portion thereof and a second free end diverging from said tubular body and terminating adjacent said flange to thereby provide a relatively low grommet seating force.

4. A fastener according to claim 3 wherein said plurality of transverse grooves on said shank comprises a series of circumferentially extending grooves defining circumferential ridges along said shank.

5. A fastener according to claim 3 wherein said at least one inwardly extending projection comprises at least one transversely oriented ridge connected to a medial portion of said radially pliant portion of said tubular body.

6. A fastener according to claim 3 wherein said head means comprises a pair of spaced apart flanges connected to said shank.

7. A fastener according to claim 3 wherein said shank and said head means of said pin are integrally formed of plastic; and wherein said flange, said tab means and said at least one inwardly extending projection of said grommet are integrally formed of plastic.

8. A fastener for releasably securing first and second panels together at respective openings therein, said fastener comprising:

a pin comprising a shank having a plurality of spaced apart transverse grooves thereon and head means connected to an end of said shank for securing said pin in the opening of the first panel; and a grommet for being secured in the opening of the second panel and for releasably receiving said shank of said pin to thereby releasably secure the first and second panels together said grommet comprising a tubular body defining a passageway for receiving said thank therein said tubular body having at least one longitudinal slot opening outwardly to an end thereof and defining a radially pliant portion of said tubular body, a flange connected to said tubular body adjacent an end thereof opposite said at least one longitudinal slot, tab means connected to said tubular body and comprising at least one outwardly biased tab cooperating with said flange for securing said grommet within the opening of the second panel, and at least one inwardly extending projection connected to an interior surface of said radially pliant portion of said tubular body for engaging one of said grooves of said shank for releasably securing said shank and said tubular body;

wherein said tubular body has a progressively decreasing outer diameter extending to the end thereof and defines a tapered end portion of said tubular body.

9. A fastener according to claim 8 wherein said pin and said grommet are relatively movable between a preassembled position, wherein said tubular body is positioned on said shank adjacent an end thereof, and an assembled position wherein said tubular body is positioned on a medial portion of said shank; and wherein an end of said shank opposite said head means is tapered and forms a continuous tapered surface with said tapered portion of said tubular body when said pin and said grommet are in the preassembled position.

10. A fastener for releasably securing first and second panels together at respective openings therein, said fastener comprising:

a pin comprising a shank having a plurality of spaced apart transverse grooves thereon, and head means connected to an end of said shank for securing said pin in the opening of the first panel; and a grommet for being secured in the opening of the second panel and for releasably receiving said shank of said pin to thereby releasably secure the first and second panels together, said grommet comprising a tubular body defining a passageway for receiving said shank therein, said tubular body having at least one longitudinal slot opening outwardly to an end thereof and defining a radially pliant portion of said tubular body, a flange connected to said tubular body adjacent an end thereof opposite said at least one longitudinal slot, tab means connected to said tubular body and comprising at least one outwardly biased tab cooperating with said flange for securing said grommet within the opening of the second panel, and at least one inwardly extending projection connected to an interior surface of said radially pliant portion of said tubular body for engaging one of said grooves of said shank for releasably securing said shank and said tubular body;

wherein said at least one longitudinal slot in said tubular body comprises a pair of opposing longitudinal slots.

11. A fastener according to claim 10 wherein said tab means comprises a pair of opposing outwardly biased tabs are rotationally offset from said pair of opposing longitudinal slots.

12. A fastener for releasably securing first and second panels together at respective openings therein, said fastener comprising:

a pin comprising a shank having a plurality of spaced apart circumferential grooves thereon, and head means connected to an end of said shank for securing said pin in the opening of the first panel; and a grommet for being secured in the opening of the second panel and for releasably receiving said shank of said pin to thereby releasably secure the first and second panels together, said grommet comprising a tubular body defining a passageway for receiving said shank therein, said tubular body having at least one longitudinal slot opening outwardly to an end thereof and defining a radially pliant portion of said tubular body, a flange connected to said tubular body adjacent an end thereof opposite said at least one longitudinal slot, tab means connected to said tubular body and comprising at least one outwardly biased tab cooperating with said flange for securing said grommet within the opening of the second panel, said tab means defining a grommet seating force for inserting said grommet into the opening of the second panel, and at least one inwardly extending projection on an interior surface of said radially pliant portion of said tubular body for engaging one of said grooves of said shank for releasably securing said shank and said tubular body;

said plurality of circumferential grooves on said shank, said at least one longitudinal slot in said tubular body, and said at least one inwardly extending projection connected to said radially pliant portion of said tubular body defining a pin seating force for advancing said pin into said grommet that is greater than the grommet seating force so that said grommet seats in the opening of the second panel before said pin advances into said grommet during initial installation of the fastener.

13. A fastener according to claim 12 wherein said pin and said grommet are relatively movable between a preassembled position, wherein said tubular body is positioned on said shank adjacent an end thereof, and an assembled position wherein said tubular body is position on a medial portion of said shank; and further comprising at least one projection connected to a medial portion of said shank adjacent said flange and extending radially outwardly when in the preassembled position and providing an initial resistance then giving way as said pin and grommet are moved from the preassembled position to the assembled position to thereby increase the pin seating force during initial installation of the fastener.

14. A fastener according to claim 12 wherein said at least one tab has one end connected to said tubular body at a medial portion thereof and a second free end diverging from said tubular body and terminating adjacent said flange to thereby provide a relatively low grommet seating force.

15. A fastener according to claim 12 wherein said tubular body has a progressively decreasing outer diameter extending to the end thereof and defines a tapered end portion of said tubular body.

16. A fastener according to claim 15 wherein said pin and said grommet are relatively movable between a preassembled position, wherein said tubular body is positioned on said shank adjacent an end thereof, and an assembled position wherein said tubular body is positioned on a medial portion of said shank; and wherein an end of said shank opposite said head means is tapered and forms a continuous tapered surface with said tapered portion of said tubular body when said pin and said grommet are in the preassembled position.

17. A fastener according to claim 12 wherein said at least one longitudinal slot in said tubular body comprises a pair of opposing longitudinal slots.

18. A fastener according to claim 17 wherein said tab means comprises a pair of opposing outwardly biased tabs are rotationally offset from said pair of opposing longitudinal slots.

19. A fastener according to claim 12 wherein said plurality of transverse grooves on said shank comprises a series of circumferentially extending grooves defining circumferential ridges along said shank.

20. A fastener according to claim 12 wherein said at least one inwardly extending projection comprises at least one transversely oriented ridge connected to a medial portion of said radially pliant portion of said tubular body.

21. A fastener according to claim 12 wherein said head means comprises a pair of spaced apart flanges connected to said shank.

22. A fastener according to claim 12 wherein said shank and said head means of said pin are integrally formed of plastic; and wherein said flange, said tab means and said at least one inwardly extending projection of said grommet are integrally formed of plastic.

23. A fastener for releasably securing first and second panels together at respective openings therein, said fastener comprising:
- a pin comprising a shank having at least one transverse groove thereon, and head means connected to an end of said shank for securing said pin in the opening of the first panel; and
- a grommet for being driven into the opening of the second panel upon the application of a predetermined force and for releasably receiving said shank of said pin to thereby releasably secure the first and second panels together, said grommet comprising
  - a tubular body defining a passageway for receiving said shank therein, said tubular body having at least one longitudinal slot opening outwardly to an end thereof and defining a radially pliant portion of said tubular body, and
  - at least one inwardly extending projection connected to an interior medial portion of said radially pliant portion of said tubular body for engaging one of said grooves of shank for releasably securing said shank and said tubular body;
- wherein said plurality of spaced apart grooves on said shank, said at least one longitudinal slot in said tubular body, and said at least one inwardly extending projection connected to said radially pliant portion of said tubular body define a pin seating force for advancing said pin into said grommet that is greater than said predetermined force so that said grommet seats in the opening of second panel before said pin advances into said grommet during initial installation of said fastener.

24. A fastener according to claim 23 wherein said at least one transverse groove on said shank comprises a series of circumferentially extending grooves defining circumferential ridges along said shank.

25. A fastener according to claim 23 wherein said head means comprises a pair of spaced apart flanges connected to said shank.

26. A fastener for releasably securing first and second panels together at respective openings therein, said fastener comprising:
- a pin comprising a shank having at least one transverse groove thereon and head means connected to an end of said shank for securing said pin in the opening of the first panel; and
- a grommet for being secured in the opening of the second panel and for releasably receiving said shank of said pin to thereby releasably secure the first and second panels together, said grommet comprising
  - a tubular body defining passageway for receiving said shank therein, said tubular body having at least one longitudinal slot opening outwardly to an end thereof and defining a radially pliant portion of said tubular body, and
  - at least one inwardly extending projection connected to an interior medial portion of said radially pliant portion of said tubular body for engaging one of said grooves of said shank for releasably securing said shank and said tubular body;
  - a flange connected to said tubular body adjacent an end thereof opposite said at least one longitudinal slot, and tab means on said tubular body and comprising at least one outwardly biased tab cooperating with said flange for securing said grommet within the opening of the second panel;
- wherein said tab means defines a grommet seating force for inserting said grommet into the opening of the second panel; wherein said plurality of spaced apart grooves on said shank, said at least one longitudinal slot in said tubular body, and said at least one inwardly extending projection connected to said radially pliant portion of said tubular body define a pin seating force for advancing said pin into said grommet that is greater than said grommet seating force so that said grommet seats in the opening of the second panel before said pin advances into said grommet during initial installation of said fastener.

27. A fastener according to claim 26 wherein said pin and said grommet are relatively movable between a preassembled position, wherein said tubular body is positioned on said shank adjacent an end thereof, and an assembled position wherein said tubular body is position on a medial portion of said shank; and
further comprising at least one projection connected to a medial portion of said shank adjacent said flange and extending radially outwardly when in the preassembled position and providing an initial resistance then giving way as said pin and grommet are moved from the preassembled position to the assembled position to thereby increase the pin seating force during initial installation of the fastener.

28. A fastener for releasably securing first and second panels together at respective openings therein, said fastener comprising:
- a pin comprising a shank having at least one transverse groove thereon, and head means connected to an end of said shank for securing said pin in the opening of the first panel; and
- a grommet for being secured in the opening of the second panel and for releasably receiving said shank of said pin to thereby releasably secure the first and second panels together, said grommet comprising
  - a tubular body defining a passageway for receiving said shank therein said tubular body having at least one longitudinal slot opening outwardly to an end thereof and defining a radially pliant portion of said tubular body, and
  - at least one inwardly extending projection connected to a interior medial portion of said radially pliant portion of said tubular body for engaging one of said grooves of said shank for releasably securing said shank and said tubular body;
- a flange connected to said tubular body adjacent an end thereof opposite said at least one longitudinal slot, and tab means on said tubular body and comprising at least one outwardly biased tab cooperating with said flange for securing said grommet within the opening of the second panel;

wherein said at least one tab has one end connected to said tubular body at a medial portion thereof and a second free end diverging from said tubular body and terminating adjacent said flange to thereby provide a relatively low grommet seating force.

29. A fastener for releasably securing first and second panels together at respective openings therein, said fastener comprising:

a pin comprising a shank having at least one transverse groove thereon, and head means connected to an end of said shank for securing said pin in the opening of the first panel; and a grommet for being secured in the opening of the second panel and for releasably receiving said shank of said pin to thereby releasably secure the first and second panels together, said grommet comprising a tubular body defining a passageway for receiving said shank therein, said tubular body having at least one longitudinal slot opening outwardly to an end thereof and defining a radially pliant portion of said tubular body, and at least one inwardly extending projection connected to an interior medial portion of said radially pliant portion of said tubular body for engaging one of said grooves of said shank for releasably securing said shank and said tubular body;

wherein said tubular body has a progressively decreasing outer diameter extending to the end thereof and defines a tapered end portion of said tubular body.

30. A fastener according to claim 29 wherein said pin and said grommet are relatively movable between a preassembled position, wherein said tubular body is positioned on said shank adjacent an end thereof, and an assembled position wherein said tubular body is positioned on a medial portion of said shank; and wherein an end of said shank opposite said head means is tapered and forms a continuous tapered surface with said tapered portion of said tubular body when said pin and said grommet are in the preassembled position.

31. A two-piece fastener for releasably securing first and second panels together at respective openings therein, said fastener including said two pieces combined in a pre-installation assembly, said fastener comprising a pin comprising head means for securing said pin in the opening of the first panel and an elongated shank extending from said head means, said shank including a plurality of shaped detents distributed along at least one side of said shank; and a grommet for being secured in the opening of the second panel and for releasably receiving said shank of said pin to thereby releasably secure the first and second panels together, said grommet comprising a tubular body having a tapered surface at one end thereof and an enlarged flange at the other end, said flange being adapted to engage a surface of the second panel when said grommet is installed in the second panel, flexible tab means extending outwardly from said tubular body and having a surface facing said flange for engaging said second panel between said surface and said flange, the force required to deflect said tab to permit passage of said second panel thereover defining a grommet seating force; and said tubular body defining an internal passage for receiving said shank therein, said passage including inwardly facing detent means for engagement with said detents on said shank;

said preliminary assembly position of said pin and said shank being defined by the insertion of said pin into said passage way until said detent means engages with the first of said detents;

the shape of said detent means and of said detents defining a seating force of said pin in said grommet which is greater than said seating force of said grommet in said second panel.

* * * * *

UNITED STATES PATENT AND TRADEMARK OFFICE
CERTIFICATE OF CORRECTION

PATENT NO. : 5,507,610
DATED : April 16, 1996
INVENTOR(S) : Nicholas M. Benedetti, Zdravko Kovac It is certified that error appears in the above-identified patent and that said Letters Patent is hereby corrected as shown below:

On the title page, the title should read: item

[54] REUSABLE FASTENER INCLUDING A PIN AND GROMMET

Signed and Sealed this

Third Day of March, 1998

Attest:

BRUCE LEHMAN

*Attesting Officer*          *Commissioner of Patents and Trademarks*